United States Patent Office 2,990,251
Patented June 27, 1961

2,990,251
PROCESS FOR PREPARATION OF HYDROGEN PEROXIDE
Ekkehard Richter, Rheinfelden, Baden, Albert Gross, Frankfurt am Main, and Gerhard Käbisch, Rheinfelden, Baden, Germany, assignors to Food Machinery and Chemical Corporation
No Drawing. Filed Nov. 21, 1957, Ser. No. 697,782
Claims priority, application Germany Nov. 24, 1956
3 Claims. (Cl. 23—207)

This invention relates to the manufacture of hydrogen peroxide by the alternate, successive, hydrogenation of an alkylated anthraquinone to form the corresponding anthrahydroquinone, and oxidation of the anthrahydroquinone formed thereby, and particularly to such a process where in the oxidation and reduction are carried out in a new solvent.

In the anthraquinone process for the manufacture of hydrogen peroxide, that is the manufacture of hydrogen peroxide by the alternate hydrogenation and oxidation of, respectively, the substituted anthraquinones and the hydrogenated derivatives thereof, and extraction from the working solution of these compounds, of hydrogen peroxide which is produced by oxidation of the anthrahydroquinone, a mixture of two or more solvents is usually employed to dissolve the anthraquinone and anthrahydroquinone working compounds. One of the solvent constituents serves as a solvent for the quinone form of the working compound, the other solvent for the hydroquinone form. Such known solvent mixtures are composed, for example, of hydrocarbons, alcohols, esters, ethers, and the like. According to German patent application No. A 21273 IVa/12i, certain ketones are suggested as single solvents for the quinone form as well as for the hydroquinone form.

The ketones referred to in the cited German patent application are the ketones in which the hydrocarbon groups next to the carbonyl group contain at least two carbons, as for example, diethyl ketone, diisopropyl ketone, or diisobutyl ketone. The solubility of 2-ethylanthraquinone, for example, at 20° C. and in diisopropyl ketone, and in diisobutyl ketone, is stated to be 8.5% and 6% respectively. Corresponding solubilities of the 2-ethylanthrahydroquinone are said to be equal to these values or somewhat larger.

It has now been found that a considerably better dissolving effect for both the quinone and hydroquinone forms can be provided if as sole solvent or as a solvent constituent with a further solvent, a methyl ketone of the general formula $CH_3—CO—R$ is used, wherein R represents a suitably singly or multiply substituted phenyl, napthyl or cyclohexyl group. Particularly suitable as solvents, according to this invention are the singly or multiply, nuclearly, alkyl-substituted and chloro-substituted acetophenones in which R is a substituted phenyl group.

The solvents employed in accordance with this invention have high boiling points and therefore low losses through evaporation in a continuous process, high flash points, low solubilities in water, and high distribution coefficients relative to water, of the hydrogen peroxide formed in the anthraquinone process. They are neither reduced nor oxidized under the reaction conditions that exist in the anthraquinone process.

The unsubstituted acetophenone, despite its excellence as a solvent for the anthraquinones and their hydro derivatives, is not suited for use as a solvent in the anthraquinone process by reason of its density of 1.026, which is close to the density of water. This makes it difficult to separate the hydrogen peroxide-containing water phase from the quinone phase during extraction of the peroxide from the working solution with water. Accordingly, it is preferred to employ a solvent having a density of at least about 0.03 removed from the density of water, namely, having a density of less than 0.97 or greater than 1.03. This permits ready extraction by water of the hydrogen peroxide that forms in the anthraquinone process.

Regarding the densities of the solvents of this invention, we have found that by the nuclear substitution of one or more alkyl groups into the ring groups in the solvents, for example by the substitution of one or more alkyl groups containing a total of 4 to 9 carbon atoms onto the phenyl nucleus of the acetophenone, or by the substitution of one or more alkyl groups containing a total of 1 to 4 carbons onto the cyclohexane or naphthalene radical of the cyclohexyl ketone or the naphthone, respectively, we provide a solvent which has a density lower than about 0.97, and which also has the other properties required of a solvent for the anthraquinone process. Thus, for example, p-tertiarybutyl acetophenone has a density of 0.962 compared with the density of 1.026 possessed by unsubstituted acetophenone. This alkylated acetophenone has a dissolving power for 2-ethylanthraquinone and 2-ethylanthrahydroquinone which is typical of the solvents of this invention, being capable of dissolving greater than about 19% of the anthraquinone form, and greater than about 8% of the hydroquinone form, and further is highly insoluble in water. It likewise has been found that substitution of one or more halogens in the ring nucleus raises the density of the solvent as compared to the unsubstituted parent compounds. Thus, for example, ortho or p-chloroacetophenone has a density of 1.188.

The solvents of this invention therefore are the nuclearly 4 to 9 carbon alkylated acetophenones, the nuclearly 1 to 4 carbon alkylated methyl cyclohexyl ketones, the nuclearly chlorinated methyl cyclohexyl ketones, the nuclearly 1 to 4 carbon alkylated acetonaphthones, and the nuclearly chlorinated acetonaphthones. These solvents possess excellent dissolving power for, and may be used with, the common working compounds used in the anthraquinone process, namely anthra- and anthrahydro-quinone, the alkylated anthra- and anthrahydroquinones, and the tetrahydro derivatives of these compounds.

The following list of solvents which fall within the present invention is included by way of illustration only, and is not intended as limitative: the nuclearly chlorinated and dichlorinated acetophenones; 2-methyl-5-isopropyl-acetophenone; p-tertiarybutyl-acetophenone; 2,4-dimethyl-4-ethyl-acetophenone; tetramethyl-acetophenone; 2-methyl-4-tertiarybutyl - acetophenone; dipropyl - acetophenone; 2,4 - dimethyl - 6 - ethyl-tertiarybutyl-acetophenone; 2,4,6-trimethyl-diethyl-acetophenone; n-octyl-acetophenone; 5-methyl-2-n-octyl-acetophenone; α-chloro-acetonaphthone; 1-methyl-acetonaphthone; 4-ethyl-acetonaphthone; 2,6-dimethyl-acetonaphthone; 1-methyl-4-ethyl-2-naphthone; chlorinated methyl-cyclohexyl-ketone, and methyl-hexahydroacetophenone.

What is claimed is:
1. Process for the manufacture of hydrogen peroxide by alternate, successive hydrogenation of alkylated anthraquinones, oxidation of the corresponding anthrahydroquinones formed by said hydrogenation, and extraction with water of hydrogen peroxide produced by said oxidation, wherein said anthraquinones and said anthrahydroquinones are employed as solutes in a working solution which contains as a solvent constituent a material from the group consisting of the ring-alkylated acetophenones in which the total number of alkyl carbon atoms is from 4 to 9, the ring-chlorinated acetophenones, the ring-alkylated methyl cyclohexyl ketones in which the total number of alkyl carbon atoms is from

1 to 4, the ring-chlorinated methyl cyclohexyl ketones, the ring-alkylated acetonaphthones in which the total number of alkyl carbon atoms is from 1 to 4, and the ring-chlorinated acetonaphthones.

2. The process according to claim 1 in which the solvent constituent is a ring-alkylated acetophenone in which the total number of alkyl carbon atoms is from 4 to 9.

3. The process according to claim 1 in which the solvent constituent is p-tertiarybutyl acetophenone.

References Cited in the file of this patent

UNITED STATES PATENTS

| | | |
|---|---|---|
| 2,890,105 | Farrell | June 9, 1959 |
| 2,902,347 | Cosby et al. | Sept. 1, 1959 |

FOREIGN PATENTS

| | | |
|---|---|---|
| 758,235 | Great Britain | Oct. 3, 1956 |
| 768,814 | Great Britain | Feb. 20, 1957 |

UNITED STATES PATENT OFFICE
CERTIFICATE OF CORRECTION

Patent No. 2,990,251                        June 27, 1961

Ekkehard Richter et al.

It is hereby certified that error appears in the above numbered patent requiring correction and that the said Letters Patent should read as corrected below.

Column 1, line 16, for "where in" read -- wherein --; column 2, line 34, after "acetophenones," insert -- the nuclearly chlorinated acetophenones, --.

Signed and sealed this 14th day of November 1961.

(SEAL)
Attest:

ERNEST W. SWIDER                                       DAVID L. LADD
Attesting Officer                                           Commissioner of Patents

USCOMM-DC